(12) United States Patent
Kloster

(10) Patent No.: US 6,524,056 B1
(45) Date of Patent: Feb. 25, 2003

(54) MOTORCYCLE LOADING, UNLOADING, STORAGE APPARATUS

(76) Inventor: Michael Kloster, 1706 Rosalie Ridge Dr. NE., Huntsville, AL (US) 35811

(*) Notice: Subject to any disclaimer, the term of this patent is extended or adjusted under 35 U.S.C. 154(b) by 0 days.

(21) Appl. No.: 09/838,499

(22) Filed: Apr. 19, 2001

(51) Int. Cl.$^7$ ................................................ B65G 67/02
(52) U.S. Cl. ................. 414/538; 280/402; 414/563; 414/537; 414/500; 414/571; 414/462; 224/571
(58) Field of Search ......................... 224/571; 414/537, 414/538, 462, 563, 500, 498, 499, 571; 280/402

(56) References Cited

U.S. PATENT DOCUMENTS

| | | | |
|---|---|---|---|
| 4,655,671 A | 4/1987 | Pratt | 414/477 |
| 5,108,248 A | 4/1992 | Murrill | 414/462 |
| 5,234,307 A | 8/1993 | Scott | 414/467 |
| 5,556,249 A | 9/1996 | Heine | 414/500 |
| 5,609,461 A | 3/1997 | Lichtenberg | 414/426 |
| 5,649,803 A | 7/1997 | Bennett | 414/537 |
| 5,730,577 A * | 3/1998 | Jones | 414/538 X |
| 5,839,875 A | 11/1998 | Miller et al. | 414/462 |
| 5,899,655 A | 5/1999 | Miller et al. | 414/462 |
| 6,089,816 A | 7/2000 | Christ | 414/538 |
| 6,120,234 A * | 9/2000 | Dinverno | 414/538 |
| 6,149,372 A * | 11/2000 | Lee et al. | 414/538 |
| 6,176,672 B1 | 1/2001 | Egan et al. | 414/462 |

* cited by examiner

Primary Examiner—Frank E. Werner
(74) Attorney, Agent, or Firm—Waddey & Patterson; Larry W. Brantley

(57) ABSTRACT

An apparatus for easily loading and unloading a motorcycle or similar vehicle onto and from the bed of a utility vehicle such as a pick-up truck which only requires a single operator. The apparatus comprises a guide rail subassembly secured to the bed of a utility vehicle, a main ramp subassembly detachably secured to the guide rail subassembly, a dolly subassembly which is adapted to support the motorcycle and ride on the main ramp subassembly and the guide rail subassembly, a plurality of adjustable tie down straps for detachably securing the motorcycle to the dolly subassembly, and an approach ramp subassembly which is detachably secured to the dolly subassembly. The dolly subassembly has a winch and a battery mounted thereon with the battery powering the winch which has one end of a flexible cable secured thereto and a free end of the flexible cable having a hook secured thereto which is adapted to be attached to an eye bolt secured to the guide rail subassembly. The dolly subassembly of the apparatuses also functions as a mobile base for easy movement of the dolly subassembly and the motorcycle secured thereto within confined areas for storage purposes.

20 Claims, 3 Drawing Sheets

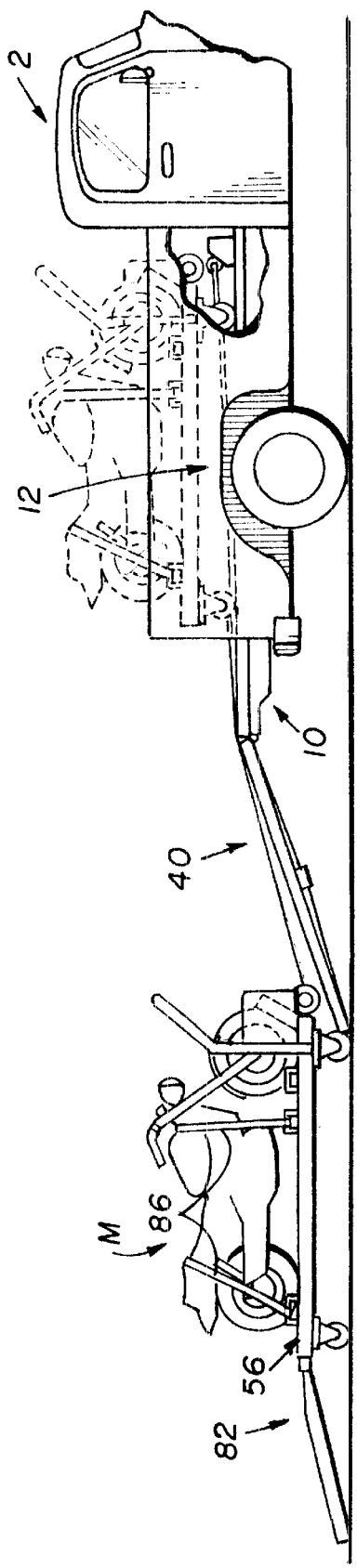
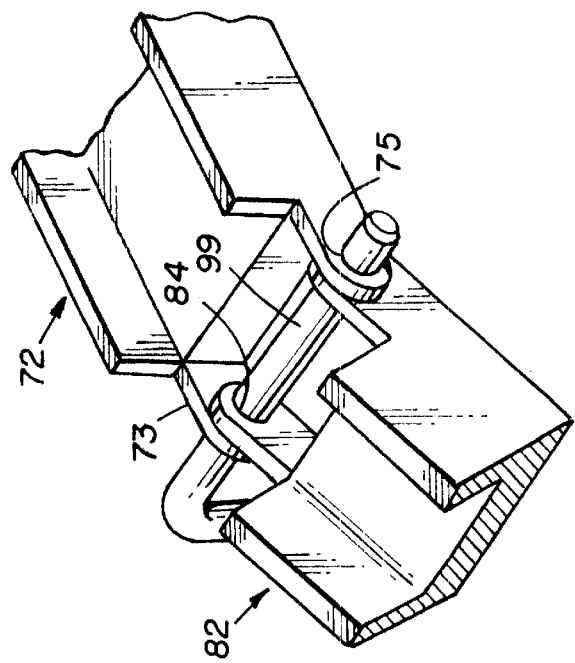
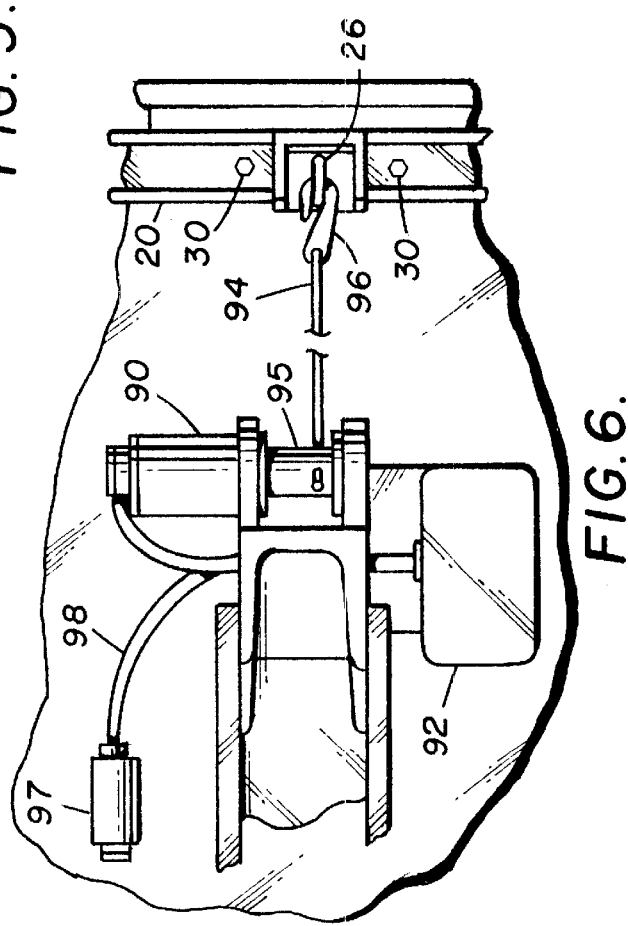

MOTORCYCLE LOADING, UNLOADING, STORAGE APPARATUS

FIELD OF THE INVENTION

This invention relates generally to a cargo loading, unloading and storage apparatus, and more particularly to an apparatus for the loading and unloading of motorcycles or the like to and from the flat bed of a utility vehicle such as a pick-up truck or trailer and permitting the easy storage and movement of the motorcycle or the like secured to a dolly subassembly.

BACKGROUND OF THE INVENTION

Motorcycles, especially racing motorcycles or trail motorcycles or pleasure A motorcycles, as well as other wheeled vehicles, are oftentime transported to and from places by loading them on and off the bed of a transporting vehicle such as a standard pick-up truck. The placement of motorcycles, other wheeled vehicles, or the like on the bed of a pick-up truck or trailer generally requires elevating the motorcycle, or other wheeled vehicle, from ground level to the level of the bed of the pick-up truck or trailer and such is normally accomplished by some type of ramp structure. The removal of the motorcycle, or other wheeled vehicle, or the like from the bed of the pick-up truck or trailer back to ground level normally requires the use of some type of ramp structure which often is the same ramp structure. In view of the inherent lateral instability of motorcycles, particularly two wheeled motorcycles, at least two people are required to safely push a normally heavy two wheeled motorcycle from ground level up the ramp structure onto the bed of the pick-up truck or trailer and remove the motorcycle along the ramp structure from the bed of the pick-up truck or trailer back to ground level to prevent the lateral tipping and falling of the two wheeled motorcycle.

The prior art abounds with apparatuses and ramp structures specifically designed for moving wheeled vehicles from ground level onto the bed of a pick-up struck or trailer and returning the wheeled vehicle from the bed of the pick-up truck to ground level. The following U.S. patents are exemplary of such prior art apparatuses or ramp structures: U.S. Pat. No. 4,655,671 (Pratt); U.S. Pat. No. 5,108,248 (Murrill); U.S. Pat. No. 5,234,307 (Scott); U.S. Pat. No. 5,556,249 (Heine); U.S. Pat. No. 5,609,461 (Lichtenberg); U.S. Pat. No. 5,730,577 (Jones); U.S. Pat. No. 6,089,816 (Christ); U.S. Pat. No. 6,099,232 (Dixon et al.); and U.S. Pat. No. 6,176,672 (Egan et al.)

The Pratt patent discloses a loading and unloading apparatus which enables a craft mounted on a cradle to be moved to and from water along a ramp structure. The Murrill patent discloses an apparatus for loading and unloading a boat and corresponding trailer to the bed of a pick-up truck which includes a pair of ramps whose leading ends have mechanisms for temporarily attaching the ramps to the rear edge of the truck to preclude the ramps from becoming disengaged from the rear edge of the pick-up truck when the trailer and boat is moving along the ramps. The Scott patent discloses a motorcycle trailer apparatus which enables on-loading and off-loading of a motorcycle strapped to a dolly by one person with the aid of a detachable ramp. The Heine patent discloses a cargo loading and unloading system for use with a pick-up truck which includes a sled for retaining cargo items, a platform mounted on the bed of the pick-up truck for receiving the sled thereon, a ramp for receiving thereover the sled and for facilitating the movement of the sled up onto and down from the platform, and mechanism between the platform and the sled for controlling the movement of the sled between ground level and the elevated bed of the pick-up truck. The Lichtenberg patent discloses a dolly for supporting a motorcycle which is easily maneuverable within a confined space so as to locate the dolly and motorcycle in a desired out of the way location while it is being stored.

The Jones patent discloses a motorcycle loading and unloading device including inclined ramp members, a pair of bed rails, and a wheeled carriage for receiving a motorcycle with the ramp members being slidable relative to the bed rails to enable the ramp members to be stored adjacent to the bed rails when the carriage and motorcycle is in position on the bed rails. The Christ patent discloses an article loading apparatus including a wheeled cart for receiving a load such as a motorcycle and ramps for permitting the loaded cart to move between ground level and the bed of a truck. The Dixon et al. patent discloses a device for loading a small vehicle onto the bed of a pick-up truck which includes two rails mounted to the bed of the pick-up truck, a ramp pivotally attached to the rails, and an interchangeable vehicle carriage pivotally attached to the ramp, and a winch for lowering and raising the vehicle carriage. The Egan et al. patent discloses an apparatus for loading and unloading a motorcycle onto and off the bed of a conventional pick-up truck and which requires only a single operator.

The prior art apparatuses, including those discussed above, have not been readily accepted by motorcyclists in that they have presented numerous problems and disadvantages particularly when compared to the simple, relatively inexpensive, loading and unloading apparatus of the present invention, which double as an apparatus for storing and easily moving a motorcycle or the like in a confined space such as a conventional garage. The prior art apparatuses have structures which are generally more complex than the structure of the present invention and present safety problems and may require more than one person to load and unload a two wheeled motorcycle. There is, therefore, a need for a simple, rugged, durable, and inexpensive apparatus for loading and unloading motorcycles or the like to and from the bed of a pick-up truck which overcome the problems and disadvantages of the prior art apparatuses. The apparatus of the present invention fulfills these needs.

SUMMARY OF THE INVENTION

The present invention is a loading, unloading and storage apparatus for loading, unloading and storing articles, particularly motorized vehicles such as motorcycles, other wheeled vehicles, and the like, and enables the easy loading and unloading of the articles onto and from a load carrying surface such as the bed of a utility vehicle or truck. When not in use for loading and/or unloading the motorized vehicle, the apparatus of the present invention allows a subassembly of the apparatus to support the motorized vehicle such that the subassembly can be easily maneuvered within a confined area such as a garage for storage purposes.

The apparatus of the present invention is intended to be used with conventional pick-up trucks, particularly of the short bed variety, but it may be used with long bed trucks or in any environment wherein articles are moved between several elevations. The apparatus of the present invention generally comprises a guide rail subassembly secured to the bed of a pick-up truck and including two parallel side rails, a main ramp subassembly including a pair of parallel rails, each of which is detachably secured to one end of a side rail of a guide rail subassembly, a dolly subassembly which is adapted to support the motorized vehicle and ride on the rails of the main ramp subassembly and the guide rail subassembly, an approach ramp subassembly which is detachably secured to the dolly subassembly, and a plurality of tie down straps for securing the motorized vehicle to the dolly subassembly and to the guide rail subassembly. The dolly subassembly has a winch and battery mounted on its forward end. The battery powers the winch which has a drum secured thereto which has a cable wrapped therearound. The free end of the cable has a hook secured thereon which is adapted for securement to an eyebolt mounted on the forward end of the guide rail subassembly.

The apparatus of the present invention provides significant advantages over prior art apparatuses in that it enables one person to easily load and unload an article such as a motorcycle onto the dolly subassembly and to load and unload the dolly subassembly and the motorized vehicle secured thereto onto and from the bed of a pick-up truck without having to obtain the assistance of others. Furthermore, the apparatus of the present invention provides a controlled loading and unloading operation for enhanced safety to the user. The apparatus of the present invention can be easily adapted by means of minor modifications for use with different shaped motorized vehicles such as four wheeled vehicles including golf carts, all terrain vehicles, and riding lawn mowers. Still furthermore, the dolly subassembly of the apparatus of the present invention also functions as a mobile base for the motorized vehicle for easy movement of the dolly subassembly and the motorized vehicle throughout a garage or other storage area.

It is therefore an object of the present invention to provide a simple, durable, apparatus which permits one person to safely move cargo between several elevations.

It is a further object of the present invention to provide a simple, durable, apparatus, which can be easily assembled and disassembled, to enable one person to move cargo such as wheeled vehicles, between ground level and an elevated bed of a utility truck under controlled conditions.

It is still a further object of the present invention to provide a relatively simple, inexpensive, durable, apparatus, which can be readily assembled and disassembled by one person for efficiently moving a wheeled vehicle such as a two wheeled motorcycle, between ground level and the elevated bed of a utility vehicle under controlled conditions.

It is yet a further object of the present invention to provide a relatively simple, inexpensive, durable apparatus, which can be readily assembled and disassembled, by one person for efficiently moving a two wheeled motorcycle under controlled conditions between ground level and the elevated bed of a pick-up truck, and which also has a dolly subassembly which supports the two wheeled motorcycle such that the dolly subassembly and the motorcycle can be easily maneuvered within a confined area for storage purposes.

These objects as well as other objects and advantages of the present invention will become more readily apparent from the following description taken in conjunction with the accompanying drawings which set forth, by way of illustration, a preferred embodiment of the invention.

BRIEF DESCRIPTION OF THE DRAWINGS

FIG. 5 is a side elevational, partially broken away, view of the apparatus of the present invention showing a motorcycle supported on the dolly assembly at ground level and also fully loaded on the guide rail assembly on the bed of the pickup truck.

FIG. 6 is a top plan, partially broken away, view showing the details of the winch, 12-volt battery, electrical cable, and switch mechanisms of the apparatus of the present invention.

FIG. 7 is a side elevational, partially broken away, view of one proposed structure for securing the approach ramp subassembly to the center track of the dolly subassembly.

DETAILED DESCRIPTION OF THE PREFERRED EMBODIMENT OF THE INVENTION

Figure 2:
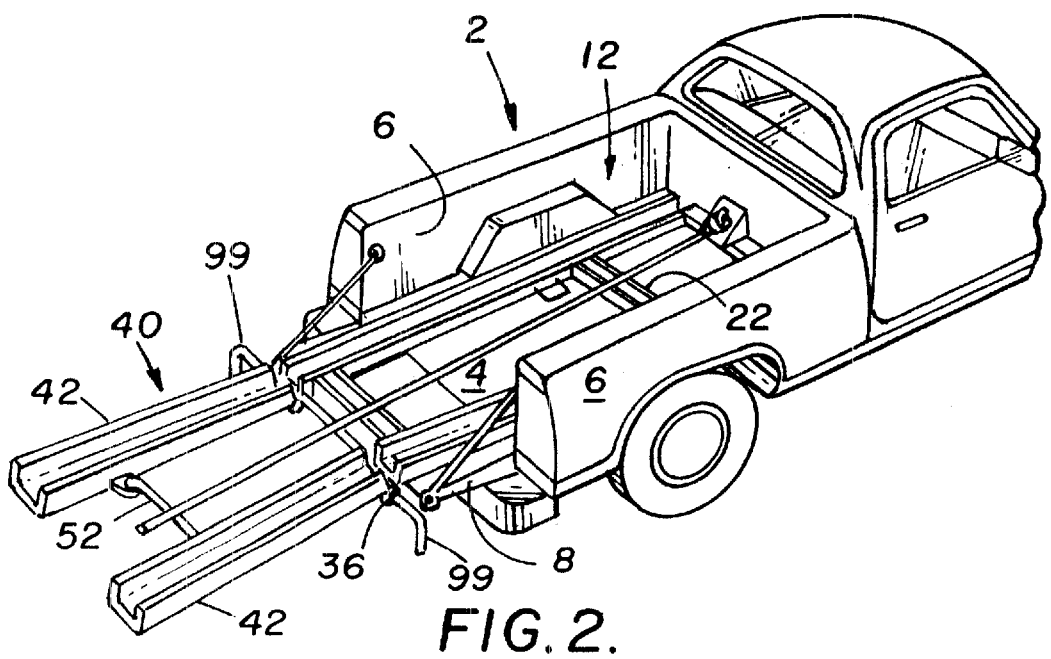
FIG. 2 is a perspective, partially broken away, view of the pick-up truck having the guide rail subassembly and the main ramp subassembly of the apparatus of the present invention with the guide rail subassembly being secured to the bed of the pick-up truck.
Figure 3:
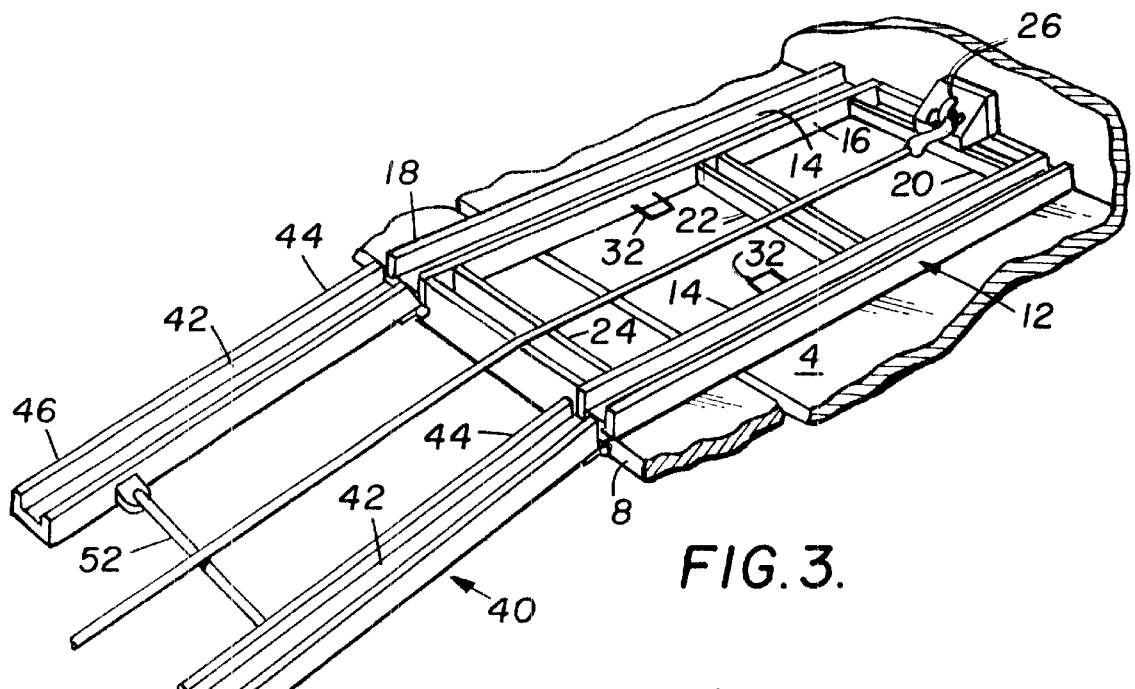
FIG. 3 is a top perspective, partially broken away, view of the guide rail subassembly and the main ramp subassembly of the motorcycle loading and unloading apparatus of the present invention as used with a pick-up truck having a generally flat bed.

Referring now to the drawings, particularly FIG. 5, reference numeral 10 generally designates the loading, unloading and storage apparatus of the present invention. As best seen in FIGS. 2, 3 and 5, reference numeral 2 generally designates a conventional pick-up truck, which is capable of use as a part of the present invention. Pick-up truck 2 generally includes a flat bed 4, a pair of parallel side members 6, and a tailgate 8 pivotally attached to the flat bed 4.

As best seen in FIG. 5, apparatus 10 generally comprises a guide rail subassembly 12, a main ramp subassembly 40, a dolly subassembly 56, an approach ramp subassembly 82, a plurality of tie down straps 86, and a motorcycle M.

Figure 4:
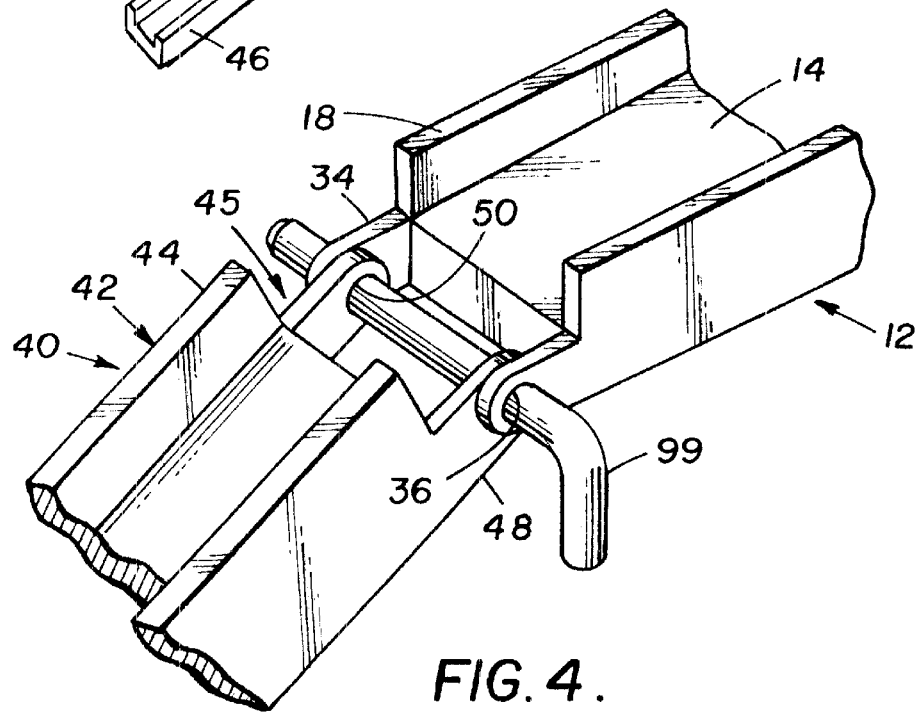
FIG. 4 is a perspective, partially broken away, view of one proposed structure for securing each ramp of the main ramp subassembly to a respective rail of the guide rail subassembly.

Referring now to FIGS. 2 and 3, the guide rail subassembly 12 comprises a pair of generally recessed or U-shaped rails or tracks 14, each having a forward end 16 and a rearward end 18, a first (forward) cross tie 20 secured by any conventional means such as welds to the forward end 16 of each generally U-shaped rail 14, an intermediate cross tie 22 secured by any conventional means such as welds to an intermediate section (unnumbered) of each generally U-shaped guide rail 14, a third cross tie 24 secured by any conventional means such as welds to the rearward ends 18 of each generally U-shaped guide rail or track 14, an eye bolt 26 secured by any conventional means such as welds or bolts and nuts to the first (forward) cross tie 20, a plurality of openings (not shown) in the first cross tie 20 for receiving bolts and nuts 30 (FIG. 6) for passing through openings (not shown) in the forward end of the flat bed 4 of truck 2, a plurality of connectors or loops 32 (FIG. 3) secured by any conventional means such as welds to each U-shaped guide rail 14 for purposes to be explained later, and a connection member 34 (FIG. 4) at the rearward end 18 of each guide rail 14 with each connection member 34 having a pair of openings 36 therein for purposes to be explained later. When anchored to the flat bed 4 of a short bed truck 2, as best seen in FIGS. 2 and 3, the tailgate 8 is in its downward, extended, condition. The tailgate might be removed from a long bed truck.

Referring now to FIGS. 2 and 3, the main ramp subassembly 40 comprises a pair of generally U-shaped or recessed ramps or tracks 42, each having a forward end 44 and a rearward end 46, a connection member 45 (FIG. 4) at the forward end 44, each connection member 45 has a projection 48 extending therefrom and having a pair of openings 50 therein for purposes to be explained later, and a detachable cross tie 52 (FIG. 3) for keeping the ramps or tracks 42 in proper alignment during use. The cross tie 52 is pivotally connected to one of the ramps 42 at one of its ends and at the other end engages the walls of an opening (not shown) in the other of the ramps or tracks 42 so that the cross tie 52 can be disengaged and pivoted towards one of the ramps 42 when apparatus 10 is not set up for loading and unloading purposes.

Figure 1:
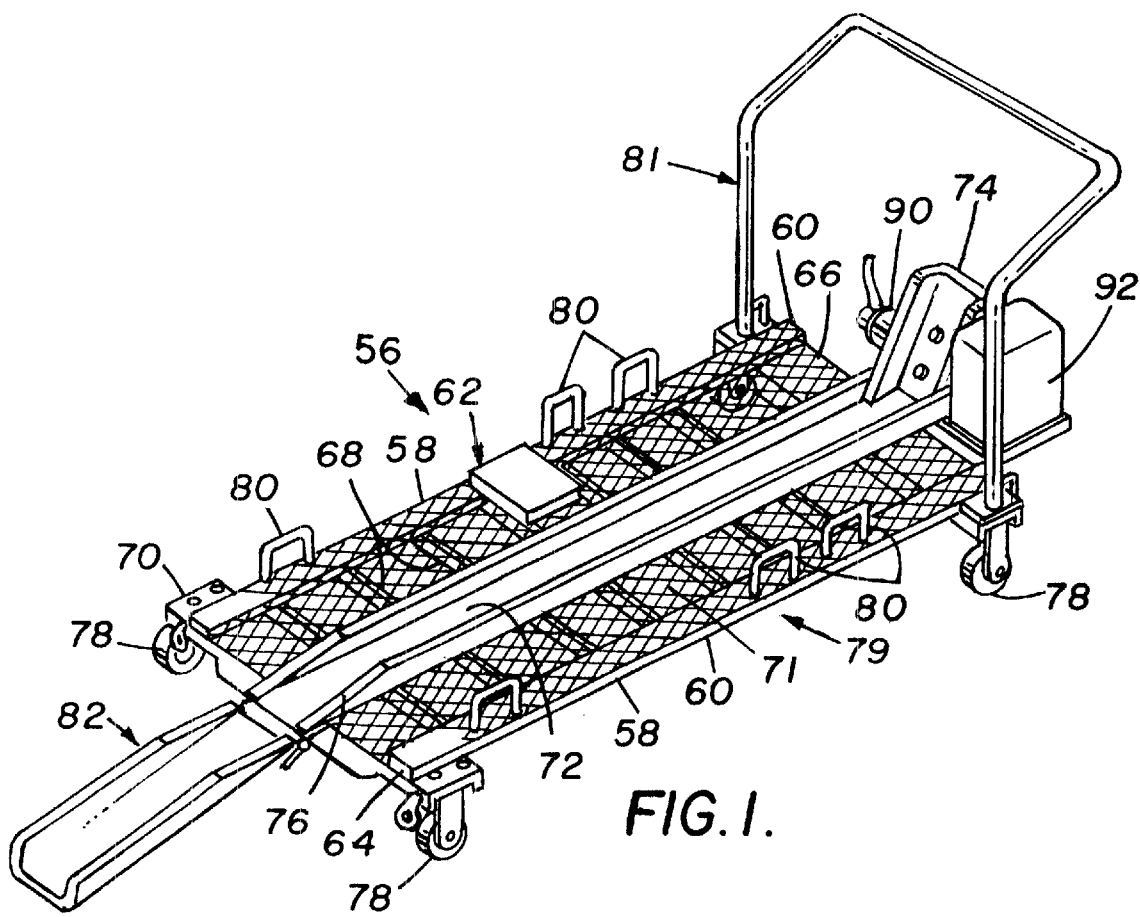
FIG. 1 is a perspective view of the dolly subassembly and the approach ramp subassembly of the apparatus of the present invention.

Referring now to FIG. 1, the dolly subassembly 56 comprises a pair of parallel side elements 58, each having a forward end 60, an intermediate section 62, and a rearward end 64, a forward cross member 66 secured by any conventional means such as welds or bolts to the forward end 60 of each side elements 58, a plurality of cross members 68 secured by any conventional means such as welds to the intermediate section 62 of the side elements 58, a rearward cross member 70 secured by any conventional means such as welds or bolts to the rearward end 64 of each side element 58, a metallic, meshed, sheeting 71 secured by any suitable means such as welds to the generally rectangular platform or frame 79 formed by the side elements 58 and the cross members 66, 68 and 70, a generally U-shaped or recessed track 72 including an upturned forward end 74 and a rearward end 76 secured over the metallic, meshed, sheeting 70 to the upper surface of the frame or platform 79 formed by the side elements 66, 68 and 70 by any suitable means such as nuts and bolts or welds, and an adjustable, lockable, swivel, caster 78 in each corner of the generally rectangular dolly subassembly 56. It has been found that casters having Item No. 18910065-C302 manufactured and/or distributed by Northern Tool & Equipment Co., 2800 Southcross Drive West, Burnsville, Minn. 55306, is suitable for use in an environment requiring the casters to be lockable in several positions, releasable brakes on the wheels, and being free to rotate about both vertical and horizontal axes as is required for best use in the present invention. As best seen in FIG. 1, a plurality of strap connecting loops 80 are secured by any suitable means such as welds to the side elements 58 for purposes to be later explained. As best seen in FIG. 7, the rearward end 76 of the generally U-shaped or recessed track 42 has a connection member 73 extending therefrom which has a pair of openings 75 therein for purposes to be explained later.

As best seen in FIGS. 1, 5 and 7 reference numeral 82 designates a generally U-shaped or recessed approach ramp subassembly which is adapted to be detachably secured to the rearward end 76 of the dolly subassembly 56. The approach ramp subassembly 82 has a connection member 83 extending therefrom which has a pair of openings 84 therein for purposes to be later explained.

As best seen in FIGS. 1 and 6, a winch 90 powered by a conventional 12-volt battery 92 is secured to the forward cross member 66 at the forward end 60 of dolly subassembly 56. The winch 90 is connected in any conventional circuit with battery 92 and is energized by switch 97 (FIG. 6) located at the free end of an electrical cable 98. Winch 90 has a drum 95 with a flexible cable 94 wound thereon with the free end of cable 94 having a hook 96 (FIG. 6) secured thereto. The hook 96 of cable 94 is adapted to be engaged to the eye bolt 26 secured to the first cross tie 20 of the guide rail subassembly 12 secured to the flat bed 4 of pick-up truck 2.

The rails or tracks 14 of the guide rail subassembly 12, the ramps or tracks 42 of the main ramp subassembly 40, the track(s) 72 of the dolly subassembly 56, and the approach ramp subassembly 82 can be made of any suitable material, but it has been found that metal channel material works very well.

Initially, apparatus 2 of the present invention (without the cargo M and tie down straps 86) is in four major pieces, namely: the guide rail subassembly 12, the main ramp subassembly 40, the dolly subassembly 56 and the approach ramp subassembly 82. When the cargo is a two wheeled motorcycle, the four major pieces are normally assembled as follows:

a. Openings (not shown) are first drilled in the forward end of the bed 4 of the pick-up truck 2. Then, with the tailgate 8 in its opened or extended position for short bed pick-up trucks or possibly removed from long bed pick-up trucks, the guide rail subassembly 12 is then laid onto the bed 4 such that the holes in the first cross tie 20 are in alignment with those in the forward end of truck bed 4, afterwhich the assembler (motorcyclist) would insert the bolts 30 (FIG. 6) in the openings and apply a nut to the threads of each bolt 30 to anchor the guide rail subassembly 12 to the bed 4 of the truck 2.

b. After the guide rail subassembly 12 is anchored to the bed 4 of the truck 2 the motorcyclist (assembler) will secure each U-shaped ramp or track 42 to a respective U-shaped rail or track 14 of the guide rail subassembly 12 by aligning the respective openings 36 and 50 and inserting a locking pins 99 through the said openings 36 and 50. The motorcyclist (assembler) will then pivot the cross tie 52 of the ramp subassembly 40 to secure its free end to the other of the ramps or tracks 42. The purpose of cross tie 52 is to hold the two ramps or tracks 42 in parallel and stable positions.

c. The motorcyclist (assembler) will then secure the approach ramp 82 to the rearward end 76 of track 22 by aligning the openings 75 and 84 and inserting the locking pins 99 within the openings 75 and 84.

d. The motorcyclist (assembler) will then align the front casters 78 of the dolly subassembly 56 with respective U-shaped tracks 42 of the ramp subassembly 40 with the casters 78 being locked in straight forward conditions.

With apparatus 2 set up as shown in FIG. 5, and explained hereinabove the motorcycle M is then pushed forward onto the approach ramp subassembly 82 and along the track 72 of the dolly subassembly 56 until the front tire (unnumbered) of the motorcycle M engages the upturned forward end 74 of the track 72 of the dolly subassembly. With the front tire of the motorcycle M engaged with the upturned forward end 74 of the track 72, at least two tie down straps 86 are threaded behind major components of the motorcycle M such as the seat, fuel tank, steering fork or the handle bars and passed through a respective strap connecting loop 80 of the dolly subassembly 56 and tightened to firmly secure the motorcycle M to the dolly subassembly 56. It has been found that adjustable, rachetable, tie down straps having Item No. 152694-B955 manufactured and/or distributed by Northern Tool & Equipment Co., 2800 Southcross Drive West, Burnsville, Minn. 55306, is suitable for use with the present invention; however, it should be understood that other adjustable tie down straps could be utilized. The motorcyclist will then withdraw the flexible cable 94 from the drum 95 of winch 90 and secure the hook 96 on the free end of the cable 94 to the eye bolt 26 on the first cross tie 20 of the guide rail subassembly 12. When hook 96 is secured to the eye bolt 26, the motorcyclist can then energize the winch 90 to cause the cable 94 to be wound about the drum 95 of the winch 90 to move the dolly subassembly 56 up the ramps 42 of the main ramp subassembly 40 and then onto the rails 14 of the guide rail subassembly 12. When the dolly subassembly 56 with the motorcycle M thereon positioned on the guide rail subassembly 12, additional tie down straps 86 can be connected to strap connecting loops 32 secured to the guide rail subassembly 12 or the truck bed 4.

When the motorcycle M and dolly subassembly 56 is fully loaded on the guide rail subassembly 12 as shown in phantom (dotted line) in FIG. 5, the motorcyclist will disconnect the approach ramp subassembly 82 from the dolly subassembly 56 by pulling the locking pin 99 which connects same, and disconnect the main ramp subassembly 40 by pulling the other locking pins 99 which connect the main rail subassembly 40 from the guide rail subassembly. The approach ramp subassembly 82, the main ramp subassembly 40, and the locking pins 99 can be stored in the bed 4 of the utility vehicle 2 under the guide rail subassembly 12.

To unload the motorcycle M from the bed 4 of utility vehicle 2, the reverse process must be followed.

Once the dolly subassembly 56 and the motorcycle M is unloaded and the dolly subassembly with the motorcycle M thereon is on the ground, the motorcyclist can unlock each of the four casters 78 such that the casters 78 rotate freely about both horizontal and vertical axes to enable the dolly subassembly 56 and the motorcycle M secured thereto to be easily maneuvered within a confined area such as a garage for storage purposes.

Although we have shown specific construction and arrangement of the parts and features constituting the preferred embodiment of the invention, changes may be made in the parts and features without affecting the operativeness of the invention. For example, it is readily apparent that the shapes of the several parts or features may be otherwise than the shapes specifically set forth herein. For example, it should be readily understood that other suitable means might be used to detachably connect the forward end 44 of each ramp 42 in the ramp subassembly 40 to the rearward end 18 of each track or rail 14 in the guide rail subassembly 12. Likewise, it should be readily understood that other suitable means might be used to detachably connect the approach ramp subassembly 82 to the rearward end 76 of the track 74 of the dolly subassembly 56. Still further, it should be readily understood that two U-shaped or channeled tracks 72 can be mounted on the platform 79 of the dolly subassembly 56 when and if four wheeled vehicles such as golf carts, all terrain vehicles, or riding lawnmowers is the cargo to be loaded, unloaded or stored. Furthermore, it should be readily understood that cotter pins or friction washers can be associated with the pins 99 to make certain that they do not become removed from the respective openings of the connecting members. It will therefore be obvious to those skilled in the art that various modifications may be made without departing from the spirit of the invention.

I claim:

1. A cargo loading, unloading and storing apparatus for use with a utility vehicle having a flat bed, said apparatus comprising:

a dolly subassembly for retaining cargo thereon, said dolly subassembly including a generally rectangular platform having two sides, a front, a rear, four corners, and mesh sheeting, a caster secured to each of the four corners of said platform, a recessed track mounted on said platform and having an upturned forward end and a rearward end, and means for securing the cargo to said platform;

a guide rail subassembly mountable to the flat bed of the utility vehicle for receiving thereon said dolly subassembly and the cargo mounted thereon, said guide rail subassembly including a pair of recessed tracks, each said track having a forward end and a rearward end, and a cross tie secured to each said forward end of said recessed tracks for connecting same;

a ramp subassembly including a pair of recessed ramps for receiving thereover selected ones of said casters for moving said dolly subassembly and cargo mounted thereon up onto and down from said recessed tracks of said guide rail subassembly, each said recessed ramp having a forward end and a rearward end, said rearward end of each said recessed ramp being adapted to contact the ground such that said recessed ramps are supported in an inclined orientation;

means for detachably securing respective said rearward ends of said recessed tracks of said guide rail subassembly to respective said forward ends of said recessed ramps of said ramp subassembly; and means interconnecting said dolly subassembly and the cargo mounted thereon and said guide rail subassembly for controlling the movement of said dolly subassembly and the cargo mounted thereon between the ground and the flat bed of the utility vehicle.

2. The cargo loading, unloading and storing apparatus of claim 1 wherein said means interconnecting said dolly subassembly and said guide rail subassembly for controlling the movement of said dolly subassembly includes a winch having a drum secured to said platform of said dolly subassembly, a flexible cable secured to said drum of said winch and to means secured to said cross tie connecting said forward ends of said recessed tracks of said guide rail subassembly.

3. The cargo loading, unloading and storing apparatus of claim 2 wherein said flexible cable includes a free end having a hook secured thereto and said means secured to said cross tie connecting said forward ends of said recessed tracks of said guide rail subassembly includes an eye bolt for receiving said hook on said free end of said flexible cable.

4. The cargo loading, unloading and storing apparatus of claim 3 wherein said means for detachably securing respective said rearward ends of said recessed tracks of said guide rail subassembly to respective said forward ends of said recessed ramps of said ramp subassembly includes openings in said rearward ends of said recessed ramps of said guide rail subassembly and in said forward ends of said recessed ramps of said ramp subassembly and a plurality of pins for placing in selected ones of said openings.

5. The cargo loading, unloading and storing apparatus of claim 4 wherein said dolly subassembly further includes means for securing said dolly subassembly to said guide rail subassembly or the vehicle.

6. The cargo loading, unloading and storing apparatus of claim 5 wherein:

said means for securing the cargo to said dolly subassembly includes a plurality of u-shaped cargo connectors secured to said platform of said dolly subassembly and at least one adjustable strap for engaging the cargo and at least one of said cargo connectors; and said means for securing the dolly subassembly to said guide rail subassembly or the vehicle includes a plurality of u-shaped dolly connectors secured to said guide rail subassembly or the vehicle and at least one adjustable strap for engaging said dolly subassembly and at least one of said dolly connectors.

7. The cargo loading, unloading and storing apparatus of claim 6 wherein the cargo secured to said platform of said dolly subassembly is a two wheeled motorcycle positioned in said recessed track mounted on said platform of said dolly subassembly.

8. The cargo loading, unloading and storing apparatus of claim 7 wherein said casters secured to the corners of said platform of said dolly subassembly are adapted to be locked or unlocked such that they may freely rotate about both vertical and horizontal axes.

9. The cargo loading, unloading and storing apparatus of claim 8 wherein said dolly subassembly serves the additional function of supporting said two wheeled motorcycle for storing purposes.

10. The cargo loading, unloading and storing apparatus of claim 4 wherein said apparatus further includes an approach ramp having connection means integral therewith and wherein said rearward end of said recessed track mounted on said platform of said dolly subassembly has means secured thereto for detachably securing said approach ramp to said recessed track of said dolly subassembly.

11. The cargo loading, unloading and storing apparatus for use with a utility vehicle having a flatbed, said apparatus comprising:

a movable dolly subassembly for retaining cargo thereupon, said dolly subassembly including a generally rectangular platform having two transverse opposite end members, two longitudinal side members secured at their ends to said transverse end members to form four corners, a plurality of intermediate members secured to said longitudinal side members, mesh sheeting secured to said platform, a caster secured to each of the four corners of said platform, means for securing cargo to said platform, and at least one channeled track secured to said platform, each of said channeled tracks having an upturned forward end and a rear end;

a guide rail subassembly mountable to the flat bed of the utility vehicle for receiving thereon said dolly subassembly and the cargo mounted thereon, said guide rail subassembly including a pair of channeled tracks, each said channeled tracks including a forward end and a rear end, and a cross tie secured to each said forward end of said channeled tracks for connecting same, said cross tie having an eye bolt secured thereto;

a ramp subassembly including a pair of channeled ramps for receiving thereover said casters for moving said dolly subassembly and cargo mounted thereon up onto and down from said channeled tracks of said guide rail subassembly, each said channeled ramp having a forward end and a rear end, said rear end of each said channeled ramp being adapted to contact the ground such that said channeled ramps are supported in an inclined orientation, and means detachably connecting said channeled ramps for stability purposes;

means for detachably securing respective said rear ends of said channeled tracks of said guide rail subassembly to respective said forward ends of said channeled ramps of said ramp subassembly; and means interconnecting said dolly subassembly and the cargo mounted thereon and said eye bolt of said cross tie of said guide rail subassembly for controlling the movement of said dolly subassembly and the cargo mounted thereon between the ground and the flat bed of the utility vehicle.

12. The cargo loading, unloading and storing apparatus of claim 11 wherein said means interconnecting said dolly subassembly and said guide rail subassembly for controlling the movement of said dolly subassembly includes a winch having a drum secured to said platform of said dolly subassembly, a flexible cable secured to said drum of said winch.

13. The cargo loading, unloading and storing apparatus of claim 12 wherein said flexible cable includes a free end having a hook secured thereto, said hook being adapted for connection to said eye bolt secured to said cross tie of said guide rail assembly.

14. The cargo loading, unloading and storing apparatus of claim 13 wherein said means for detachably securing respective said rear ends of said channeled tracks of said guide rail subassembly to respective said forward ends of said channeled ramps of said ramp subassembly includes openings in said rear ends of said channeled rails of said guide rail subassembly and in said forward ends of said channeled ramps of said ramp subassembly and a plurality of pins for placing in selected ones of said openings.

15. The cargo loading, unloading and storing apparatus of claim 14 wherein said dolly subassembly further includes means for securing said dolly subassembly to said guide rail subassembly or the vehicle.

16. The cargo loading, unloading and storing apparatus of claim 15 wherein:

said means for securing the cargo to said dolly subassembly includes a plurality of u-shaped cargo connectors secured to said platform of said dolly subassembly and at least one adjustable strap for engaging the cargo and at least one of said cargo connectors; and said means for securing the dolly subassembly to said guide rail subassembly or the vehicle includes a plurality of u-shaped dolly connectors secured to said guide rail subassembly or the vehicle and at least one adjustable strap for engaging said dolly subassembly and at least one of said dolly connectors.

17. The cargo loading, unloading and storing apparatus of claim 16 wherein the cargo secured to said platform of said dolly subassembly is a two wheeled motorcycle positioned in said at least one channeled track mounted on said platform of said dolly subassembly.

18. The cargo loading, unloading and storing apparatus of claim 17 wherein said casters secured to the corners of said platform of said dolly subassembly are adapted to be locked or unlocked such that they may freely rotate about both vertical and horizontal axes.

19. The cargo loading, unloading and storing apparatus of claim 18 wherein said dolly subassembly serves the additional function of supporting said two wheeled motorcycle for storing purposes.

20. The cargo loading, unloading and storing apparatus of claim 14 wherein said apparatus further includes an approach ramp having connection means integral therewith and wherein said rear end of said recessed track mounted on said platform of said dolly subassembly has means secured thereto for detachably securing said approach ramp to said recessed track of said dolly subassembly.

* * * * *